US012490889B2

(12) United States Patent
Wang et al.

(10) Patent No.: US 12,490,889 B2
(45) Date of Patent: Dec. 9, 2025

(54) METHOD AND APPARATUS FOR GASTRIC EXAMINATION USING A CAPSULE CAMERA

(71) Applicant: CAPSOVISION, Inc., Saratoga, CA (US)

(72) Inventors: Kang-Huai Wang, Saratoga, CA (US); Gordon C. Wilson, San Francisco, CA (US); Ganyu Lu, Palo Alto, CA (US)

(*) Notice: Subject to any disclaimer, the term of this patent is extended or adjusted under 35 U.S.C. 154(b) by 505 days.

(21) Appl. No.: 17/968,693

(22) Filed: Oct. 18, 2022

(65) Prior Publication Data
US 2023/0039420 A1    Feb. 9, 2023

Related U.S. Application Data

(63) Continuation-in-part of application No. 16/764,850, filed on May 16, 2020, now abandoned.

(51) Int. Cl.
| | |
|---|---|
| *A61B 1/04* | (2006.01) |
| *A61B 1/00* | (2006.01) |
| *A61B 5/07* | (2006.01) |
| *G02B 13/06* | (2006.01) |
| *H04N 23/698* | (2023.01) |
| *H04N 23/50* | (2023.01) |

(52) U.S. Cl.
CPC .......... *A61B 1/041* (2013.01); *A61B 1/00009* (2013.01); *A61B 1/00016* (2013.01); *A61B 5/073* (2013.01); *G02B 13/06* (2013.01); *H04N 23/698* (2023.01); *H04N 23/555* (2023.01)

(58) Field of Classification Search
CPC . A61B 1/00147; A61B 1/041; A61B 1/00009; A61B 1/00016; A61G 13/04; A61G 2203/10
See application file for complete search history.

(56) References Cited

U.S. PATENT DOCUMENTS

| | | | |
|---|---|---|---|
| 7,817,354 B2 | 10/2010 | Wilson | |
| 7,983,458 B2 | 7/2011 | Wang et al. | |
| 2008/0300458 A1* | 12/2008 | Kim | A61B 34/73 600/118 |
| 2010/0198008 A1* | 8/2010 | Kawano | A61B 1/00183 600/109 |

* cited by examiner

*Primary Examiner* — Aaron B Fairchild
(74) *Attorney, Agent, or Firm* — Blairtech Solution LLC

(57) ABSTRACT

A method for imaging a patient's gastrointestinal tract using a capsule camera and a patient positioning system are disclosed. According to the method, the capsule camera is administered to a patient by swallowing the capsule camera through patient's mouth. For each target examination position selected from a set of examination positions: the patient positioning system is adjusted to a target positioner bed position associated with the target examination position with the patient on the positioner be. Adjusting patient positioning system comprises adjusting the positioner bed to tilt at a tilt angle, and wherein the set of examination positions comprises at least two different tilt angles; and the patient positioning system still is held at the target examination position for a pre-defined period of dwelling time to allow the capsule camera to capture stable pictures. Image data captured by the capsule camera are then collected.

25 Claims, 12 Drawing Sheets

METHOD AND APPARATUS FOR GASTRIC EXAMINATION USING A CAPSULE CAMERA

CROSS REFERENCE TO RELATED APPLICATIONS

The present invention is a continuation-in-part application of and claims priority to U.S. Non-Provisional application Ser. No. 16/764,850 filed on 16 May, 2020, which is a U.S. National Stage Application under 35 USC 371 for International Application No. PCT/US2017/067144, filed on 18 Dec. 2017. The present invention is also related to U.S. Pat. No. 7,817,354, entitled "Panoramic Imaging System", granted on Oct. 19, 2010 and U.S. Pat. No. 7,983,458, entitled "In Vivo Autonomous Camera with On-Board Data Storage or Digital Wireless Transmission in Regulatory Approved Band", granted on Jul. 19, 2011. The U.S. patents are hereby incorporated by reference in their entireties.

FIELD OF THE INVENTION

The present invention relates to diagnostic imaging inside the human body or any other living creature. In particular, the present invention relates to a method and system for imaging upper parts of the stomach.

BACKGROUND AND RELATED ART

Devices for imaging body cavities or passages in vivo are known in the art and include endoscopes and autonomous encapsulated cameras. Endoscopes are flexible or rigid tubes that pass into the body through an orifice or surgical opening, typically into the esophagus via the mouth or into the colon via the rectum. An image is formed at the distal end using a lens and transmitted to the proximal end, outside the body, either by a lens-relay system or by a coherent fiber-optic bundle. A conceptually similar instrument might record an image electronically at the distal end, for example using a CCD or CMOS sensor array, and transfer the image data as an electrical signal to the proximal end through a cable. Endoscopes allow a physician or a veterinary physician control over the field of view and are well-accepted diagnostic tools. However, they do have a number of limitations, present risks to the patient, are invasive and uncomfortable for the patient, and their cost restricts their application as routine health-screening tools.

Because of the difficulty traversing a convoluted passage, endoscopes cannot easily reach the majority of the small intestine and special techniques and precautions, that add cost, are required to reach the entirety of the colon. Endoscopic risks include the possible perforation of the bodily organs traversed and complications arising from anesthesia. Moreover, a trade-off must be made between patient pain during the procedure and the health risks and post-procedural down time associated with anesthesia.

An alternative in vivo image sensor that addresses many of these problems is the capsule endoscope. A camera is housed in a swallowable capsule, along with a radio transmitter for transmitting data, primarily comprising images recorded by the digital camera, to a base-station receiver or transceiver and data recorder outside the body. The capsule may also include a radio receiver for receiving instructions or other data from a base-station transmitter. Instead of radio-frequency transmission, lower-frequency electromagnetic signals may be used. Power may be supplied inductively from an external inductor to an internal inductor within the capsule or from a battery within the capsule.

An autonomous capsule camera system with on-board data storage was disclosed in the U.S. Pat. No. 7,983,458, entitled "In Vivo Autonomous Camera with On-Board Data Storage or Digital Wireless Transmission in Regulatory Approved Band," granted on Jul. 19, 2011. This patent describes a capsule system using on-board storage such as semiconductor nonvolatile archival memory to store captured images. After the capsule passes from the body, it is retrieved. Capsule housing is opened and the images stored are transferred to a computer workstation for storage and analysis. For capsule images either received through wireless transmission or retrieved from on-board storage, the images will have to be displayed and examined by diagnostician to identify potential anomalies.

While forward-looking capsule cameras include one camera, there are other types of capsule cameras that use multiple cameras to provide side view or panoramic view. A side or reverse angle is required in order to view the tissue surface properly. It is important for a physician or diagnostician to see all areas of these organs, as polyps or other irregularities need to be thoroughly observed for an accurate diagnosis. A camera configured to capture a panoramic image of an environment surrounding the camera is disclosed in U.S. Pat. No. 7,817,354, entitled "PANORAMIC IMAGING SYSTEM", granted on Oct. 19, 2010.

While capsule endoscopes (CEs) are an important diagnostic tool for visualizing the gastrointestinal (GI) tract, most commercial CEs are indicated for visualizing the esophagus, small bowel, or colon. Although capsules pass through the stomach after a patient swallows them, they do not typically image the entire stomach adequately for definitive diagnosis. After entering the proximal stomach from the esophagus, they quickly drop to the distal stomach under the force of gravity. Due to the limited field of view (FOV) of the camera(s) in the capsule, some gastric mucosal surfaces, particularly in the fundus and cardia, are not captured within the camera's FOV. Due to the capsule's rapid drop, the illumination control does not have time to optimize the exposure for each imaged surface and captured images may exhibit motion blur. Once the capsule has settled in the bottom of the stomach, it is unable to visualize the proximal portion of the stomach. FIG. 1 illustrates a scenario in which a end-facing capsule camera settles in the bottom of the stomach with the camera facing up. The field of view (FOV) of the camera is indicated. Also various parts around the stomach are labelled. The stomach is partially filled with fluid and the fluid line is indicated. If the capsule's center of mass is at a position offset from the center of volume in a direction away from the camera, then the capsule will orient vertically, with the camera facing up. However, the fundus is distant and viewed at low magnification and it may be outside the camera's depth of field and thus in poor focus. Moreover, the stomach is not typically as distended as shown in FIG. 1. When the stomach is more collapsed and folded, the capsule does not always have a clear line of sight from one region of the stomach to another.

To visualize the stomach completely, the capsule's position within the stomach must be controlled to some extent. If the capsule is buoyant, then it will float at the fluid line within the stomach, and move down as the fluid drains into the small bowel. However, it is not feasible to fill the stomach with enough water to float the capsule to the top of the stomach to visualize that area. Therefore, CE has generally not been effective for diagnosing the upper (i.e., proximal) stomach. The low detection rate associated with using capsule endoscopy for detecting gastric cancer in upper stomach has been reported in a study by Jun et al., (*Detection of Neoplastic Gastric Lesions Using Capsule Endoscopy: Pilot Study*, Hindawi Publishing Corp, Gastroenterology Research and Practice, Vol. 2013, Article ID 730261, 5 pages, at http://dx.doi.org/10.1155/2013/730261). In this study, the patients change positions every 30 seconds in sequence from the supine position to left lateral, supine, right lateral, supine, right lateral-head up tilt, and right lateral-head down tilt positions after they swallow capsule endoscope. The detection rate using CE is compared with the detection rate using esophagogastroduodenoscopy. In the study, the esophagogastroduodenoscopy scores seven out of eight cases while the CE only scores four out of eight cases. In the study, the detection rate using CE is still not satisfactory even if the patients turned to various lie in various pose positions on the patient bed.

In order to manipulate the capsule while the capsule is travelling through the human GI tract, systems for manipulating the capsules by magnetic fields have been developed and disclosed before. One version of such a capsule is moved around the stomach by a magnet mounted on a robotic arm while the patient lies supine. The system for manipulating the magnet is large and expensive. Another system uses a handheld magnet to manipulate the capsule. In either case, the careful attention of a clinician is needed to steer the capsule around the stomach and manipulate the pose position of the camera to observe the entire stomach.

Accordingly, it is desirable to develop methods or systems that can manipulate the capsule position within a patient's stomach without complicated equipment. Furthermore, it is desirable that the methods and systems are simple for the clinician and patient.

BRIEF SUMMARY OF THE INVENTION

A patient positioning system for imaging a patient's gastrointestinal tract using a capsule camera is disclosed. The patient positioning system comprises a positioner bed adapted to allow the patient to lie on the positioner bed; a support frame; at least three support posts connected between the positioner bed and the support frame, wherein at least two of said at least three support posts are configured to adjust height according to one or more control signals so as to cause the positioner bed to tilt at a tilt angle, to cause the positioner bed to rotate about a longitudinal axis of the positioner bed by a rotation angle; a controller coupled to said at least two of said at least three support posts to provide said one or more control signals to control the tilt angle, the rotation angle or both via controlling said at least two of said at least three support posts to cause the patient on the positioner bed to go through a sequence of patient examination positions; and wherein the controller is configured to cause a rate of tilt or rotation angle change according to a pre-defined frame capture rate of the capsule camera. In one embodiment, the controller is configured to cause at least one frame being captured for every two degrees change of positioner bed tilt or rotation angle.

In one embodiment, each of said at least three support posts is connected to the positioner bed through a universal joint. In another embodiment, each of said at least two of said at least three support posts is connected to the support frame through a joint.

The patient positioning system may further comprise a restraint to hold down the patient onto the positioner bed. The rotation angle has a range covering at least 180° rotation about the longitudinal axis of the positioner bed. The patient positioning system may further comprise monitoring means. For example, the monitoring means may correspond to a monitoring subsystem to monitor the tilt angle, the rotation angle, or a combination thereof to verify a current examination position being compliant. The monitoring subsystem may comprise an image input device to capture one or more images of patient's pose position for determining the current examination position. The patient positioning system may further comprise means for sending commands to the patient or a clinician to change patient's lie pose on the positioner bed or to adjust the positioner bed to tilt at a target tilt angle so that the positioner bed is caused to go through a sequence of patient examination positions to allow the capsule camera to capture images of patient's gastrointestinal tract including proximal parts of patient's stomach. For example, the means for sending commands may comprise a user interface to issue a series of commands to the patient or a clinician for changing patient's position on the positioner bed according to the sequence of patient examination positions. The series of commands can be issued via audio or by visual display to instruct or demonstrate correct movements or positioning associated with the sequence of patient examination positions.

The patient positioning system may further comprise a memory device to store program codes, wherein the program codes are executable on the controller to cause the patient on the positioner bed to go through the sequence of patient examination positions. The program codes can be configured to cause at least two different tilt angles to be included in the sequence of patient examination positions. The program codes may also be configured to cause at least one tilt angle corresponding to patient's upper body reclined by about 10° to about 30° to be included in the sequence of patient examination positions. The program codes can be configured cause a set of tilt angles included in the sequence of patient examination positions, wherein the set of tilt angles corresponds to patient's upper body reclined to a first angle and then to a second angle in small steps, and wherein the first angle and the second angle correspond to 10° and 30° respectively or 30° and 10° respectively. The program codes may also be configured to cause the pre-defined period of dwelling time dependent on a frame capture rate of the capsule camera so that at least one frame is captured per each 2 degrees over the tilt angle range (e.g. approximately 0° to 10°, 0° to 15°, 0° to 20°, or 0° to 30°). The change in tilt may be continuous, with no dwelling at a fixed position, but sufficiently slow to minimize the sloshing of fluid in the stomach and sufficiently slow relative to the capsule camera frame rate so that at least one frame is captured per each 2 degrees over the tilt angle range. In yet another embodiment, the program codes are configured to cause at least two different rotation angles about the longitudinal axis of the positioner bed. In yet another embodiment, the program codes are configured to cause the positioner bed to return to a flat position while the patient changes position to reduce patient's effort and risk of falling off the positioner bed. In still yet another embodiment, the program codes are configured to cause holding the positioner bed still at each patient examination position for a pre-defined period of time to allow the capsule camera to capture stable images. The pre-defined period of dwelling time may correspond to 5 to 10 seconds. The change in rotation angle may be continuous, with no dwelling at a fixed position, but sufficiently slow to minimize the sloshing of fluid in the stomach and sufficiently slow relative to the capsule camera frame rate so that at least one frame is captured per each 2 degrees over the rotation angle range. The patient positioning system may further comprise a viewing subsystem to display images captured by the capsule camera, where the patient's pose position, the tilt angle, or both associated with each image is displayed by the viewing subsystem.

The patient positioning system may further comprise a communication channel to communicate with the capsule camera. The communication channel can be configured to receive images or other sensor data captured by the capsule camera, to transmit one or more commands to the capsule camera, or both. The positioner bed can be adjusted in response to the images received from the capsule camera. The commands may cause the capsule camera to adjust operational parameters.

A method for imaging a patient's gastrointestinal tract including proximal parts of patient's stomach using a capsule camera and a patient positioning system is also disclosed where the patient positioning system comprises a positioner bed for the patient to lie on. The method comprises: administering the capsule camera to a patient by swallowing the capsule camera through patient's mouth, wherein the capsule camera takes pictures without propulsion while travelling through the patient's gastrointestinal tract. For each target patient examination position of a sequence of patient examination positions: the positioner bed is adjusted to a target positioner-bed position associated with the target patient examination position with the patient on the positioner bed, where said adjusting the positioner bed comprises adjusting the positioner bed to tilt at a tilt angle, adjusting the positioner bed to rotate about a longitudinal axis of the positioner bed at a rotation angle, or adjusting the positioner bed to tilt and to rotate, and wherein the sequence of patient examination positions comprises at least two different tilt angles. The positioner bed is held still at the target patient examination position for a pre-defined period of dwelling time to allow the capsule camera to capture stable images. Image data captured by the capsule camera are collected.

Another patient positioning system for imaging a patient's gastrointestinal tract including proximal parts of patient's stomach using a capsule camera is also disclosed. The patient positioning system comprises a positioner bed adapted to allow the patient to lie on the positioner bed, a bed support coupled to the positioner bed to provide support to the positioner bed, means for tilting at least a portion of the positioner bed at a tilt angle, and means for sending one or more commands to the patient or a clinician to change patient's lie pose on the positioner bed or to adjust the positioner bed to tilt at a target tilt angle so that the positioner bed is caused to go through a sequence of patient examination positions to allow the capsule camera to capture images of patient's gastrointestinal tract including proximal parts of patient's stomach. The patient positioning system may further comprise means for monitoring the positioner bed, the patient's lie pose or both to determining whether the positioner bed, the patient's lie pose or both are in compliance with a target patient examination position. The means for sending one or more commands may comprise audio means or visual means to instruct or demonstrate correct movements or positioning associated with the sequence of patient examination positions. The means for monitoring the positioner bed, the patient's lie pose or both may comprise means for capturing images or video of the positioner bed, the patient's lie pose or both.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

To overcome the limitations of existing solutions, we disclose a capsule camera system that can manipulate the capsule position within a patient's stomach without complicated equipment that is simple for the clinician and patient.

Figure 2A:
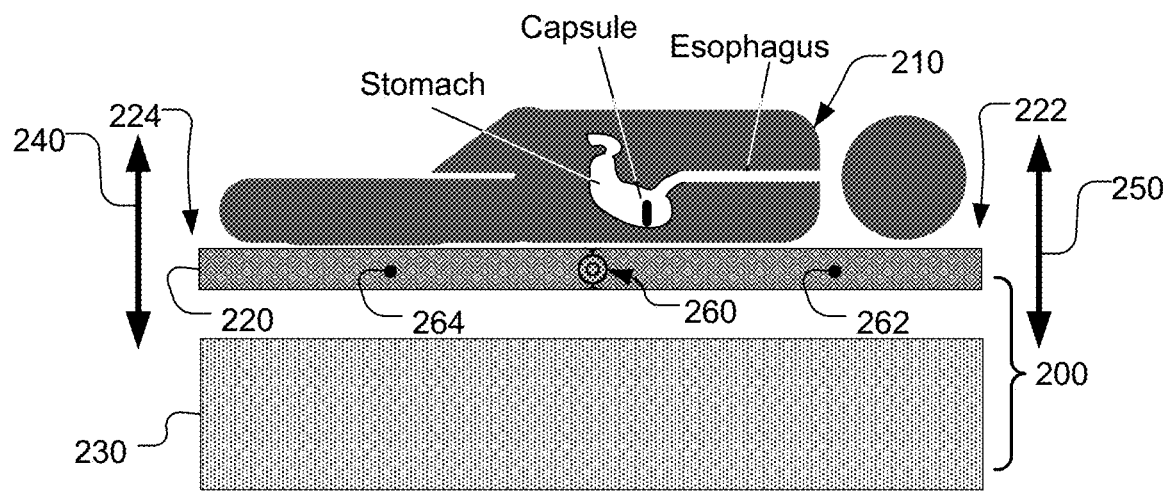
FIG. 2A illustrates a scenario with a patient lying on a patient-positioning system and includes a positioner bed on which the patient lies and a support resting on the floor, where the positioner bed can be tilted to raise or lower the upper part of the patient.

According to the present invention, a patient positioning system is disclosed. Preferably the patient ingests the capsule by swallowing it, but the capsule may be endoscopically placed in the stomach if the patient is unable to swallow it. Before or immediately after the patient ingests the capsule camera, the patient lies down on the patient positioning system. The patient positioning system can then be operated to get the patient to various positions for imaging the proximal parts of the stomach including the cardia and the fundus. However, the present invention is not limited to visualizing the stomach. FIG. 2A (side view) and FIG. 2B (front view) illustrate an example patient position. A patient is lying on the patient positioning system 200, which includes a surface 220 (e.g. the positioner bed) on which the patient 210 lies, and a bed support 230 in FIG. 2A to support the positioner bed. The bed support is also referred as support in this disclosure. The support may be resting on the floor or it may be attached to a wall or ceiling. The support may include casters or wheels on the bottom so that the patient-positioning system can be moved around easily. It may support the positioner bed from below, from the side, or from above. The surface can be in a rectangular shape or other similar shape for a patient to lie down on with their body fully supported. For convenience, the two ends of the positioner bed can be referred as a head end 222 and a foot end 224. According to the present invention, the surface inclination can be manipulated. For example, the foot end 224 can be raised or lowered as indicated by the arrowed line 240. In another example, the head end 222 can be raised or lowered as indicated by the arrowed line 250. In yet another example, both the head end 222 and the foot end 224 can be manipulated to be raised or lowered. Furthermore, the positioner bed does not have to be a single rigid piece. For example, the positioner bed may comprise two sections joined by a jointer 260 at a location near the center. Therefore, the head section 262 can be moved without affecting the foot section 264. During imaging, the inclination of the patient's torso is of interest. In the discussion that follows, references to the inclination or tilt angle of the positioner will be understood to refer to that portion of the positioner supporting the torso while other portions supporting the head and lower extremities may be at different tilt angles as needed for patient comfort and safety. The positioner may also include actuators, controls, audio-visual equipment, restraints, user interface, and computer. Some of these, such as the computer, may physically be separate from the rest of the positioner but connected via a communication channel.

In FIG. 2A, the surface 220 is shown in a horizontal position and the capsule has passed from the mouth through the esophagus to the stomach. The capsule's center of mass is offset from its center of volume towards one end so that, absent other forces, it remains oriented approximately vertically in gravity. If the center of mass is also offset in the transverse plane of the capsule, its nominal orientation will be slightly tilted from vertical. The force applied by the stomach at points of contact and the force of moving liquid may temporarily tilt the capsule's position away from the nominal orientation. In one embodiment, the capsule camera has a center of mass offset from a center of volume of the capsule camera such that the capsule camera is nominally oriented with a center of mass of the capsule camera below the center of volume of the capsule camera so that said at least two target patient examination positions correspond to different relative orientation angles between the capsule camera and the patient's gastrointestinal tract and at least a portion of an area of the patient's gastrointestinal tract imaged by the capsule camera in one target patient examination position is not imaged in the other target patient examination position.

The patient positioning system controls the orientation of the patient. In the simplest case, the positioner can be simply a standard hospital bed which can be tilted to raise or lower the patient's upper torso relative to the lower torso (i.e. a rotation about an axis in the patient's transverse plane). To visualize the proximal stomach regions, such as the fundus and cardia, the positioner bed is reclined at an angle such as 10°, 20°, 30°, 40°, or 50° and the patient is partially inverted. Since human anatomy may have very substantial variations from individual to individual. A positioning system with few pose positions and relatively fast movement among them may result in an inferior system. There are some pose positions with particular reclined angles, say anywhere between 10° and 30° being optimal depending on the individual's anatomy. For example, 16° may be optimal for subject A and 29° may be optimal for subject B. In a preferred embodiment, the positioning bed may move starting at a reclined position from 10° to 30° in small steps, such as every 0.5°, 1° or 2°. At each target patient examination position, the positioner bed will stay still for a pre-defined period of dwelling time. For example, a period of 5 to 10 seconds may be good enough. Alternatively, there might be a few steps as refinement to dwell on for a few seconds each. In yet another embodiment, the pose position change continuously from 10° to 30°, but sufficiently slowly, so that subjects with a wide range of anatomic variations in terms of angles (or orientations) could have the images taken at optimal, or close to optimal position. The speed of angle or position movement is relevant to camera frame rates so that each degree within 10°-30° of the above mentioned example, 1 frame is taken per degree. These are practical considerations and much more important requirements. Furthermore, caution needs to be taken to prevent the capsule from exiting the stomach through the pyloric valve prematurely due to the force of gravity during visualizing the proximal stomach.

In addition, the patient may also roll about their longitudinal axis to change their orientation on the positioner, such as prone, supine, on the left side, or on the right side. By combining the rolling motion with the positioner bed tilting, a variety of body orientations can be achieved.

In order to let the patient roll from one side to another easily and safely, the positioner bed may be returned to the flat position while the patient changes position, reducing the patient's effort and the risk of falling off the positioner. After each longitudinal roll, the positioner may again be reclined to partially invert the patient. With each tilt of the positioner bed, the capsule moves along the stomach, toward the distal end when the positioner bed is leveled or inclined forward and toward the proximal end when it is reclined backwards. This capsule movement allows for a range of camera views of the mucosa in the stomach, including views of surfaces within the rugal folds of the stomach wall that might be missed if the capsule were stationary.

Figure 2B:
FIG. 2B illustrates front view of a patient on the positioner bed, where the positioner bed can be rotated around a longitudinal axis of the positioner bed.

In another embodiment, rather than requiring the patient to roll from one position to another, the positioner bed can rotate along its longitudinal axis as shown in FIG. 2B. The patient can be held down onto the bed by an optional restraint, such as one or more frames, belts, harnesses, straps, and/or rods. The positioner bed could then be rotated through a maximum rotation angle about the longitudinal axis. For example, the rotation angle can be up to ±90°. In another example, the rotation angle can be up to ±180° (i.e., a total of 360°). With rotation about two axes, such as a longitudinal and transverse axis, the patient positioning system can position the patient's body at any angle relative to the gravitational field.

In yet another embodiment, the patient positioning system can move the patient smoothly through a programmed series of motions autonomously without any action by the patient or a system operator. The system includes the memory to store the program and motion controllers to control the positioner motion. In a hospital environment, if a tool is difficult to use and complicated, it will take a lot of time to learn how to use the tool correctly and properly. Also, it needs constant relearning to keep the skill fresh. Furthermore, in a hospital environment, mistakes will be prone to happen and the patient will pay a dear price for it. Often, the consequence of mistake is irreversible or even resulting in mortality. Therefore, it's imperative to simplify this complex sequence of positioning by automating the system with a controller to minimize the effort on the part of the nurses or other health professionals and to make the examination process useful and pragmatic in the hospital environment. The controller may comprise input interface to receive user input (e.g. user command) and/or monitoring information (e.g. patient's pose and/or positioner bed tilt/rotation angles).

Figure 3A:
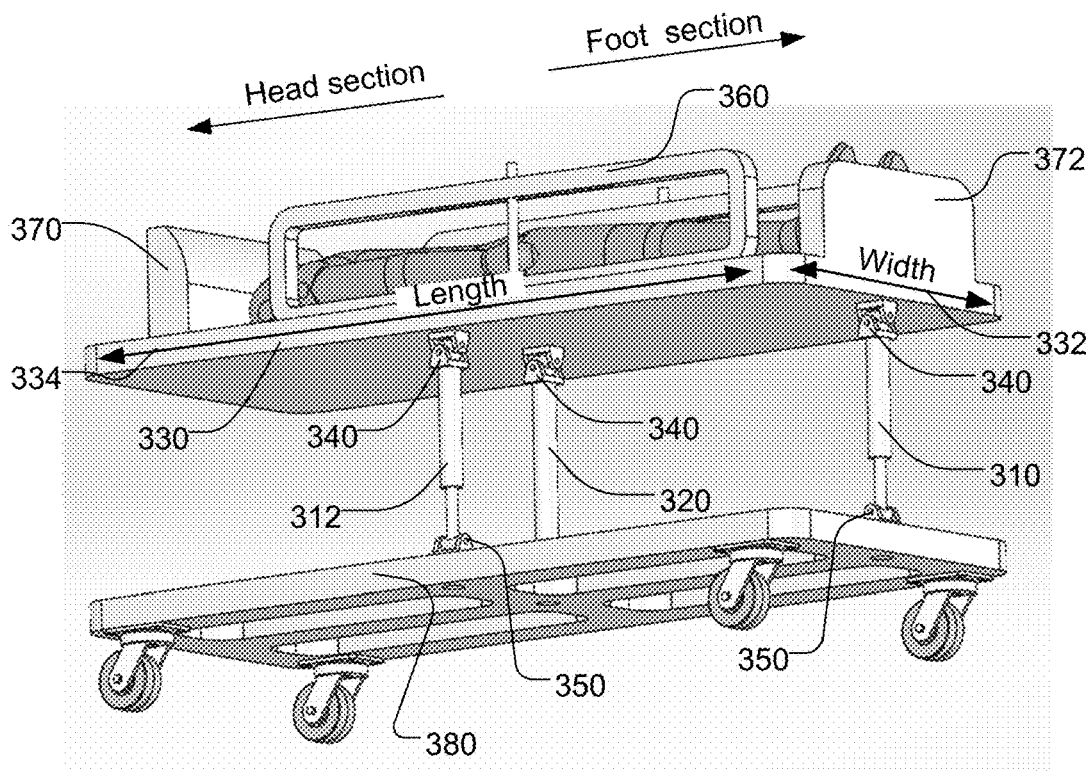
FIGS. 3A-B illustrate a preferred embodiment of the present invention, where two linear actuators and one fixed support are used to enable the tilt and roll motions of the positioner bed as desired.
Figure 3B:
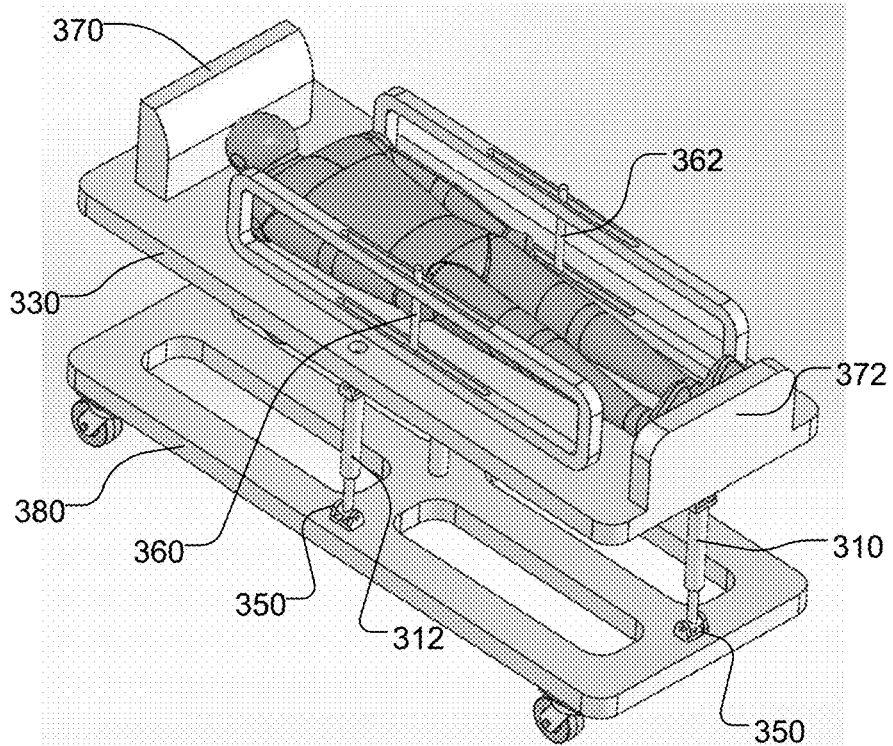

FIGS. 3A-B illustrate a preferred embodiment of the present invention. In FIGS. 3A-B, two linear actuators (310 and 312) and one fixed support 320 are used to enable the tilt and roll motions of the positioner bed (330) as desired. The actuators and the fixed support are also referred as support posts in this disclosure. The actuators can be based on a stepper motor, servo motor or pneumatic. Actuator 312 is preferred to be positioned closed to the foot end or foot section 372 of the positioner bed and near the center of the positioner bed in the width direction 332. The two support posts 312 and 314 are preferred to be located beyond the middle point toward the head section 370 in the length direction 334. The support posts 312 and 314 shown in FIGS. 3A-B are close to the center in the length direction to shorten the distance between support post 310 and support posts 312 and 314. The shorter distance allows the actuators to achieve a higher inclination angle. In order to provide the needed flexibility between the support posts and the positioner bed 330, a universal joint 340 is used between each support post (310, 312 or 320) and the positioner bed 330. For the bottom part of the actuators, a joint 350 is also used between the support post and the support frame 380. The joint 350 can be a rotary bearing (ball bearing). On the positioner bed (330), adjustable hand rails (right-hand side 360 and left-hand side 362) are provided for safety. Also, an adjustable head block 370 and a foot block 372 are attached to the positioner bed 330. The actuators (310 and 312) can be coupled to the controller to receive one or more control signals in order to automatically adjust the heights to achieve a desired tilt, a desired roll or both.

Figure 4A:
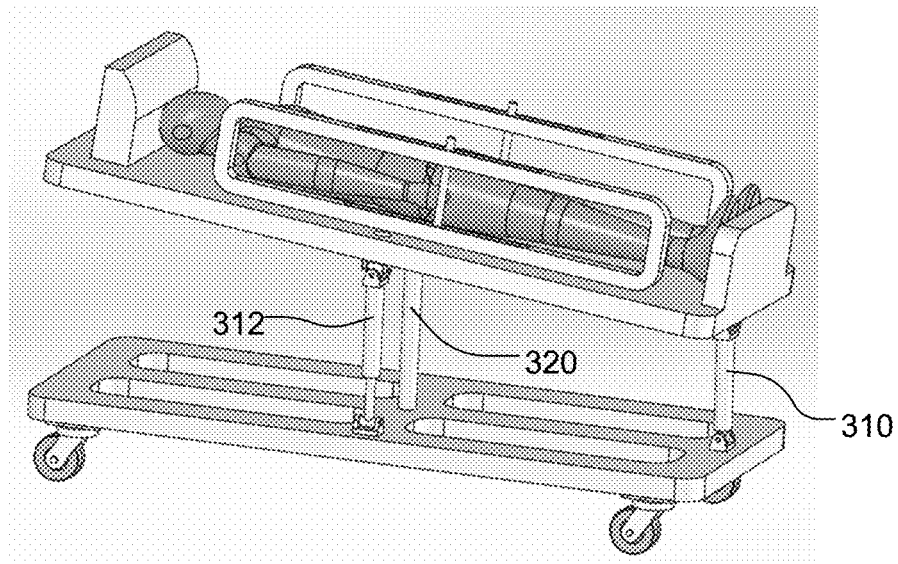
FIG. 4A illustrates an example of tilting with the head section higher than the foot section of the positioner bed by lowering actuator while the actuator is set to maintain the same height as the fixed support.
Figure 4B:
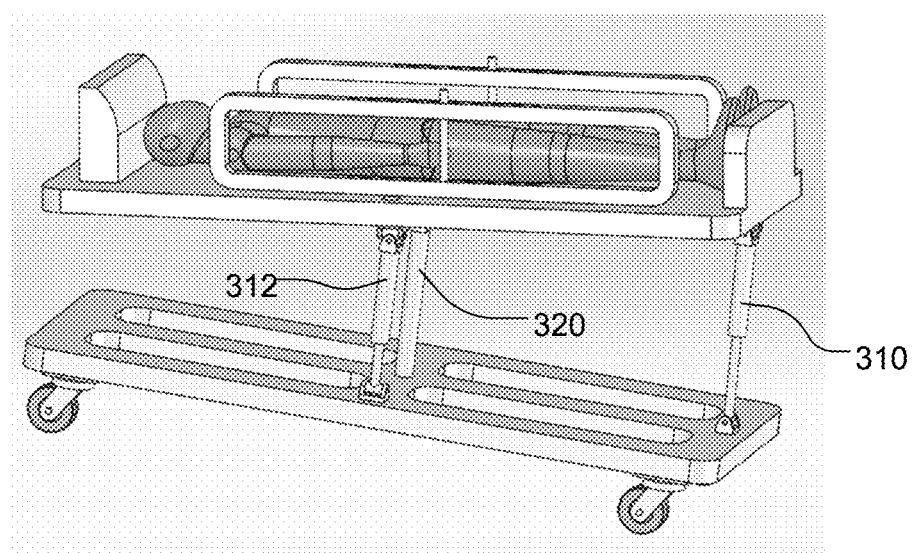
FIG. 4B illustrates an example of tilting with the head section lower than the foot section of the positioner bed by raising actuator while the actuator is set to maintain the same height as the fixed support.

The patient positioning system as shown in FIGS. 3A-B can be operated to provide the tilt and roll motions of the positioner bed 330 by controlling the actuators (310 and 312). FIG. 4A illustrates an example of tilting with the head section higher than the foot section of the positioner bed 330 by lowering actuator 310 while the actuator 312 is set to maintain the same height as the fixed support 320. The tilt of the positioner bed refers to the relative height of the head section and the foot section in this disclosure. A 0° tilt angle refers to the positioner bed at the head section is at the same height as the positioner bed at the foot section. A positive tilt angle may refer to the positioner bed at the head section is higher than the positioner bed at the foot section. A negative tilt angle may refer to the positioner bed at the head section is lower than the positioner bed at the foot section. FIG. 4B illustrates an example of tilting with the head section lower than the foot section of the positioner bed 330 by raising actuator 310 while the actuator 312 is set to maintain the same height as the fixed support 320.

Figure 5A:
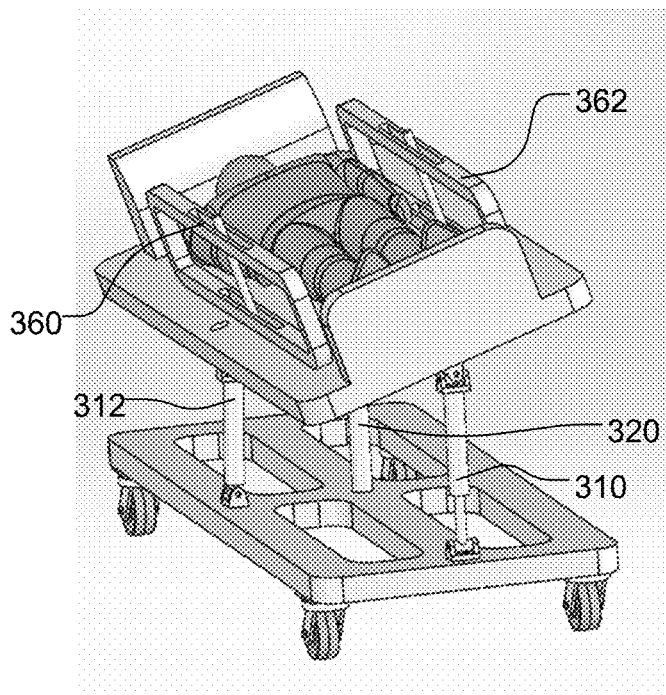
FIG. 5A illustrates an example of rolling toward right of the positioner bed (i.e., right-hand side rail is lower than left-hand side rail) by lowering actuator 312.
Figure 5B:
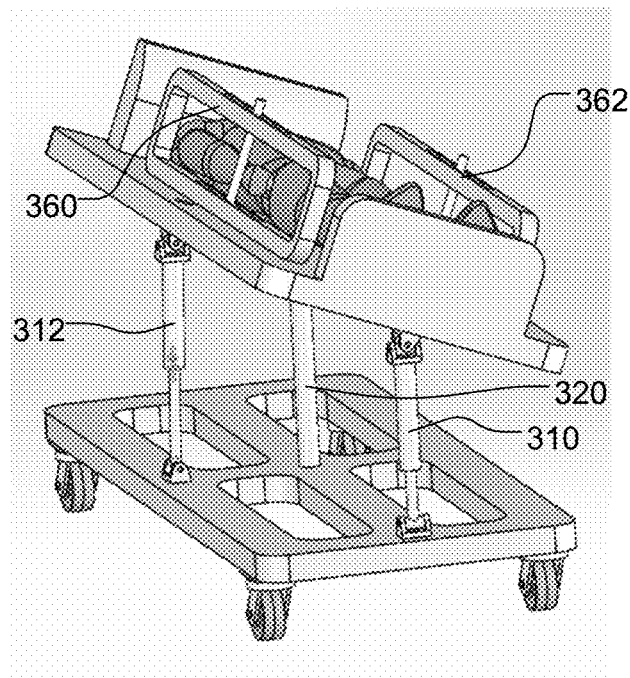
FIG. 5B illustrates an example of rolling toward left of the positioner bed (i.e., right-hand side rail 360 is higher than left-hand side rail) by raising actuator 312.

FIG. 5A illustrates an example of rolling toward right of the positioner bed 330 (i.e., right-hand side rail 360 is lower than left-hand side rail 362) by lowering actuator 312. In order to maintain the head section and foot section of the positioning bed leveled, actuator 310 needs to be lowered roughly about a fraction of the lowered distance of actuator 312. The roll of the positioner bed refers to the rotation of the positioner bed around the longitudinal axis of the positioner bed (an axis aligned with the length direction of the positioner bed that goes through the center of the positioner bed in the width direction) in this disclosure. A 0° roll angle refers to the left side of the positioner bed is leveled with the right side of the positioner bed. A positive tilt angle may refer to the right side (the right-side hand rail 360) of the positioner bed is lower than the left side (the left-side hand rail 360) of the positioner bed, which may also be referred as rolling right. A negative tilt angle may refer to the left side of the positioner bed is lower than the right side of the positioner bed, which may also be referred as rolling left. FIG. 5B illustrates an example of rolling toward left of the positioner bed 330 (i.e., right-hand side rail 360 is higher than left-hand side rail 362) by raising actuator 312. In order to maintain the head section and foot section of the positioning bed leveled, actuator 310 needs to be raised roughly about a fraction of the raised distance of actuator 312.

Figure 6:
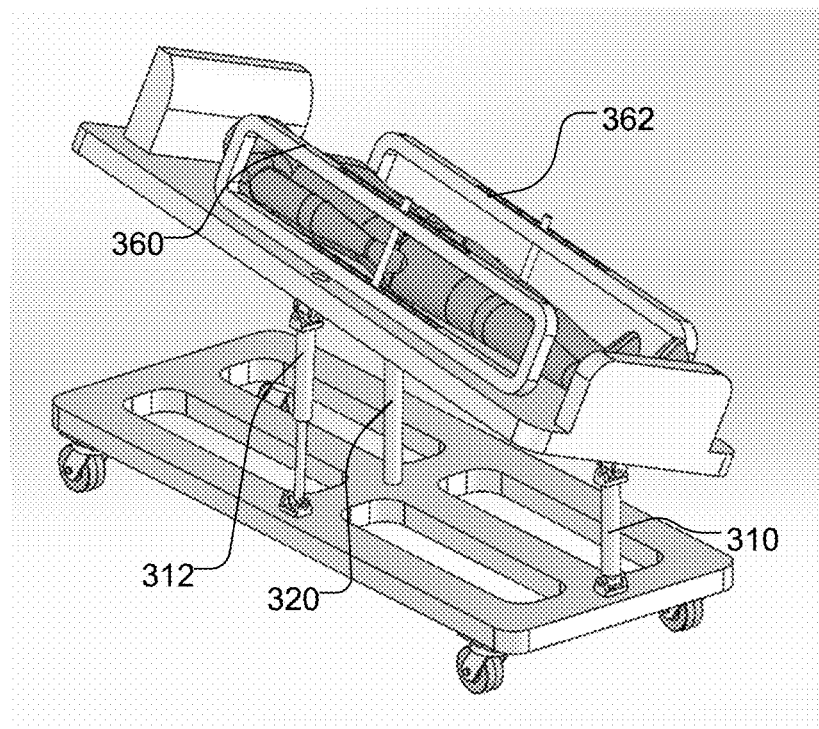
FIG. 6 illustrates an example of tilting and rolling of the positioner bed by controlling actuators 310 and 312.

The patient positioning system as shown in FIGS. 3A-B can be operated to provide the tilt and roll motion of the positioner bed 330 by controlling the actuators (310 and 320). FIG. 6 illustrates an example of tilting and rolling of the positioner bed by controlling actuators 310 and 312. As shown in FIG. 6, actuator 312 is raised and actuator 310 is lowered, which causes the head section higher than the foot section. Also, it causes the positioning bed to roll toward the left side. As is known that any three points in the space can define a plane, the three contact points between the three universal joints and the positioning bed can define a plane aligned with the positioning bed. The plane defined by the three contact joints corresponds to a desired titling/rolling position. The extent of the tilting/rolling is bounded by the movement range of the actuators. To achieve a higher degree of titling/rolling of the positioning bed, more movement ranges of the actuators will be required.

Figure 7A:
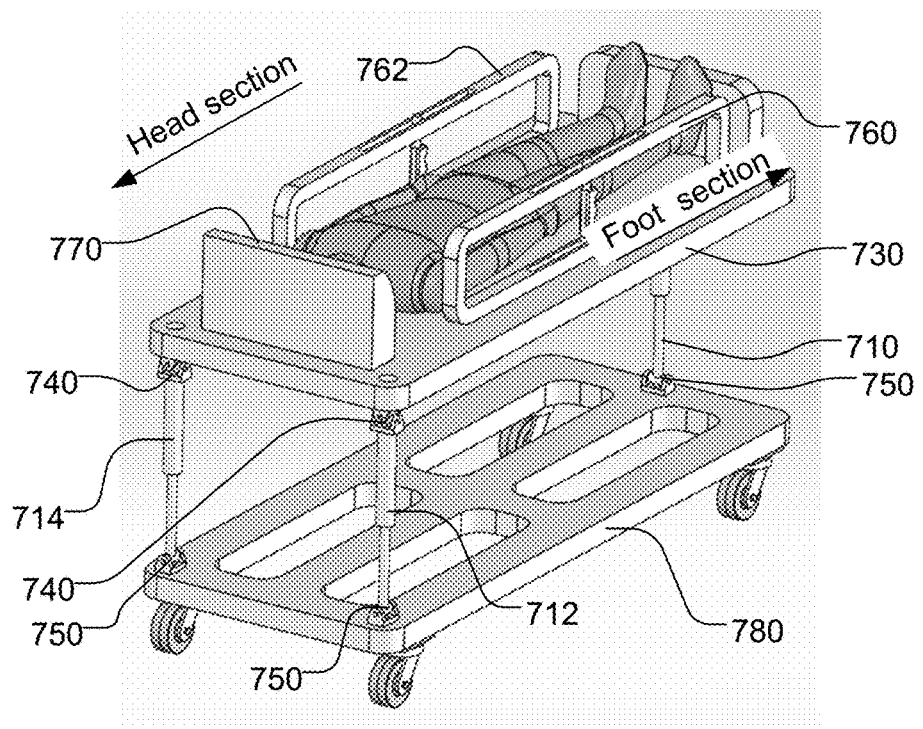
FIGS. 7A-B illustrate a preferred embodiment of the present invention, where three linear actuators are used to enable the tilt and roll motions of the positioner bed as desired.
Figure 7B:
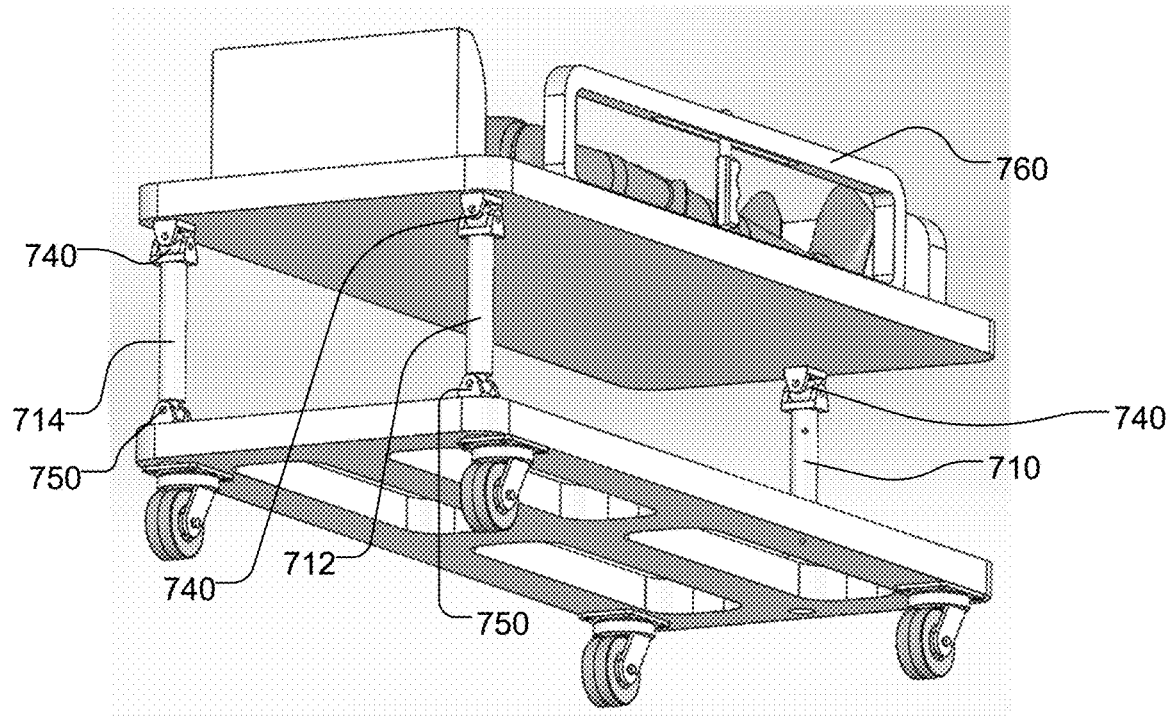

The patient positioning system as shown in FIGS. 3A-B uses a fixed support 320. Therefore, the height of the positioning bed at the location joining the fixed support 320 is fixed. It is desirable to achieve a desired tilting/rolling position at different heights of the positioning bed. Accordingly, another embodiment according to the present invention is shown in FIGS. 7A-B. In FIGS. 7A-B, three linear actuators (710, 712 and 714) are used to enable the tilt and roll motion of the positioner bed (730) as desired. In order to provide the needed flexibility between the support posts and the positioner bed 730, a universal joint 740 is used between each support post (710, 712 and 714) and the positioner bed 730. For the bottom part of the actuators, a joint 750 is also used between the support post and the support frame 780. The joint 750 can be a rotary bearing (ball bearing). On the positioner bed (730), adjustable hand rails (right-hand side 760 and left-hand side 762) are provided for safety. Also, an adjustable head block 770 is attached to the positioner bed 730. In FIG. 7A, all actuators (710, 712 and 714) are extended to raise the positioner bed 730 to a higher position. In FIG. 7B, all actuators (710, 712 and 714) are retracted to lower the positioner bed 730 to a lowest position. The actuators (710, 712 and 714) can be coupled to the controller to receive one or more control signals in order to automatically adjust the heights to achieve a desired tilt, a desired roll or both.

Figure 8A:
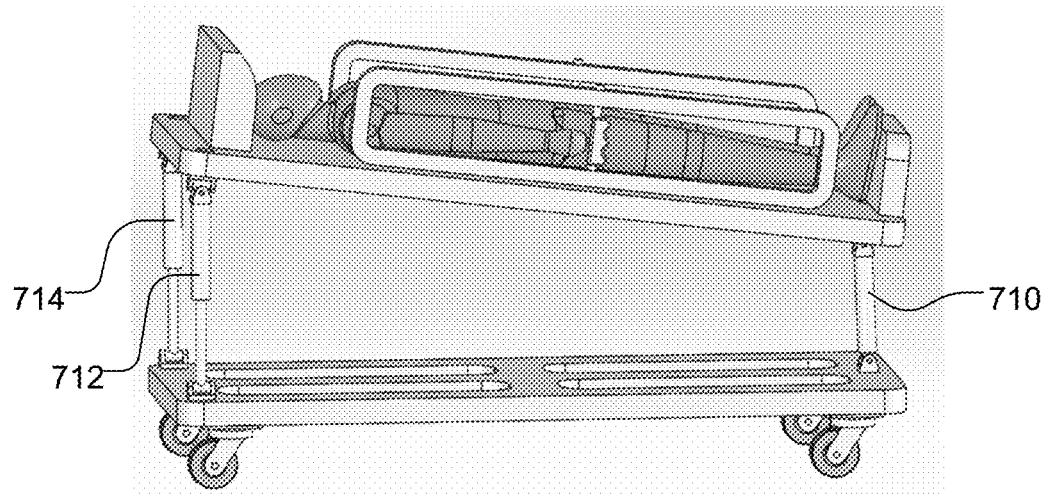
FIG. 8A illustrates an example of tilting with the head section higher than the foot section of the positioner bed by lowering actuator 710 to the lowest position while raising actuators 712 and 714 by a same amount.
Figure 8B:
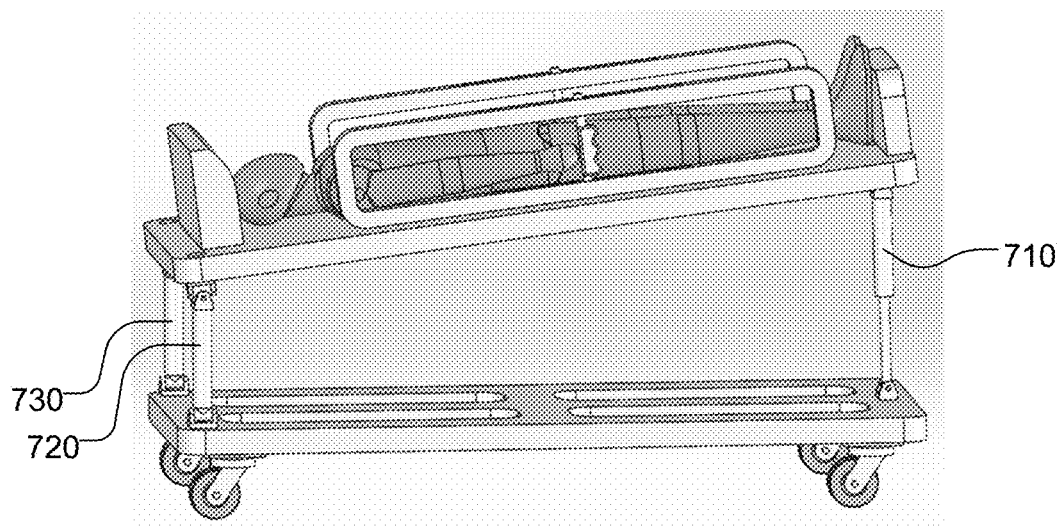
FIG. 8B illustrates an example of tilting with the head section lower than the foot section of the positioner bed by raising actuator 710 while keeping actuators 712 and 714 at the lowest position.

FIG. 8A illustrates an example of tilting with the head section higher than the foot section of the positioner bed 730 by lowering actuator 710 to the lowest position while raising actuators 712 and 714 by a same amount. The positioner bed can be maintained at the same inclination angel by further raising all three actuators by a same height. FIG. 8B illustrates an example of tilting with the head section lower than the foot section of the positioner bed 730 by raising actuator 710 while keeping actuators 712 and 714 at the lowest position. Again, the positioner bed can be maintained at the same inclination angel by further raising all three actuators by a same height.

Figure 9A:
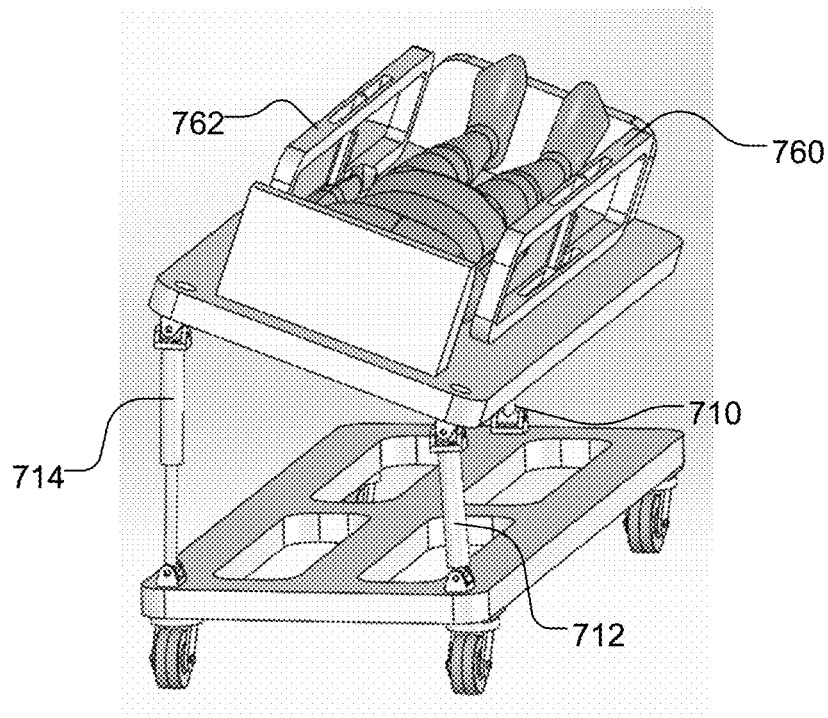
FIG. 9A illustrates an example of rolling toward right of the positioner bed (i.e., right-hand side rail is lower than left-hand side rail) by raising actuator 714.
Figure 9B:
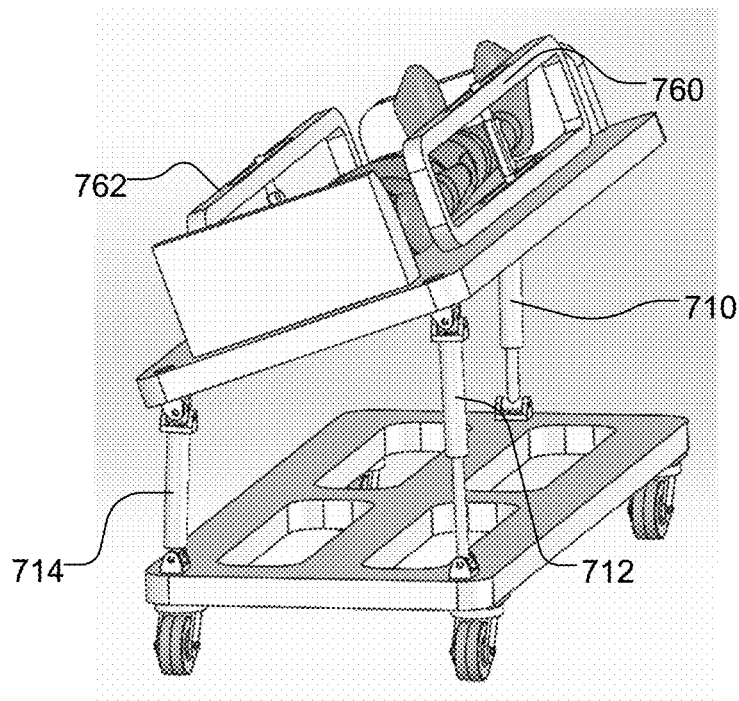
FIG. 9B illustrates an example of rolling toward left of the positioner bed (i.e., right-hand side rail is higher than left-hand side rail) by raising actuator 712.

FIG. 9A illustrates an example of rolling toward right of the positioner bed 730 (i.e., right-hand side rail 760 is lower than left-hand side rail 762) by raising actuator 714. In order to maintain the head section and foot section of the positioning bed leveled, actuator 710 needs to be raised roughly about half of the raised distance of actuator 714. The positioner bed can be maintained at the same rolling angel by raising all three actuators by a same height. FIG. 9B illustrates an example of rolling toward left of the positioner bed 730 (i.e., right-hand side rail 760 is higher than left-hand side rail 762) by raising actuator 712. In order to maintain the head section and foot section of the positioning bed leveled, actuator 710 needs to be raised roughly about half of the raised distance of actuator 712. Again, the positioner bed can be maintained at the same rolling angel by further raising all three actuators by a same height.

FIG. 6 illustrates an example to achieve tilting and rolling using two actuators. By keeping actuator 714 fixed, the embodiment in FIGS. 7A-B can achieve the same tilting and rolling as that shown in FIG. 6. Furthermore, all three actuators can be raised or lowered by a same amount to maintain the tilting and rolling.

The controller may comprise output interface to provide one or more control signals to the actuators to adjust the heights so as to achieve a desired tile angle, a desired rotation angle or both. The controller may comprise a computation engine such as a CPU, a digital signal processor, FPGA (Field Programmable Gate Array) or other electronic circuitry to process input signals and provide control signals. The computation engine may execute program codes stored in a media such as computer memory.

Figure 10:
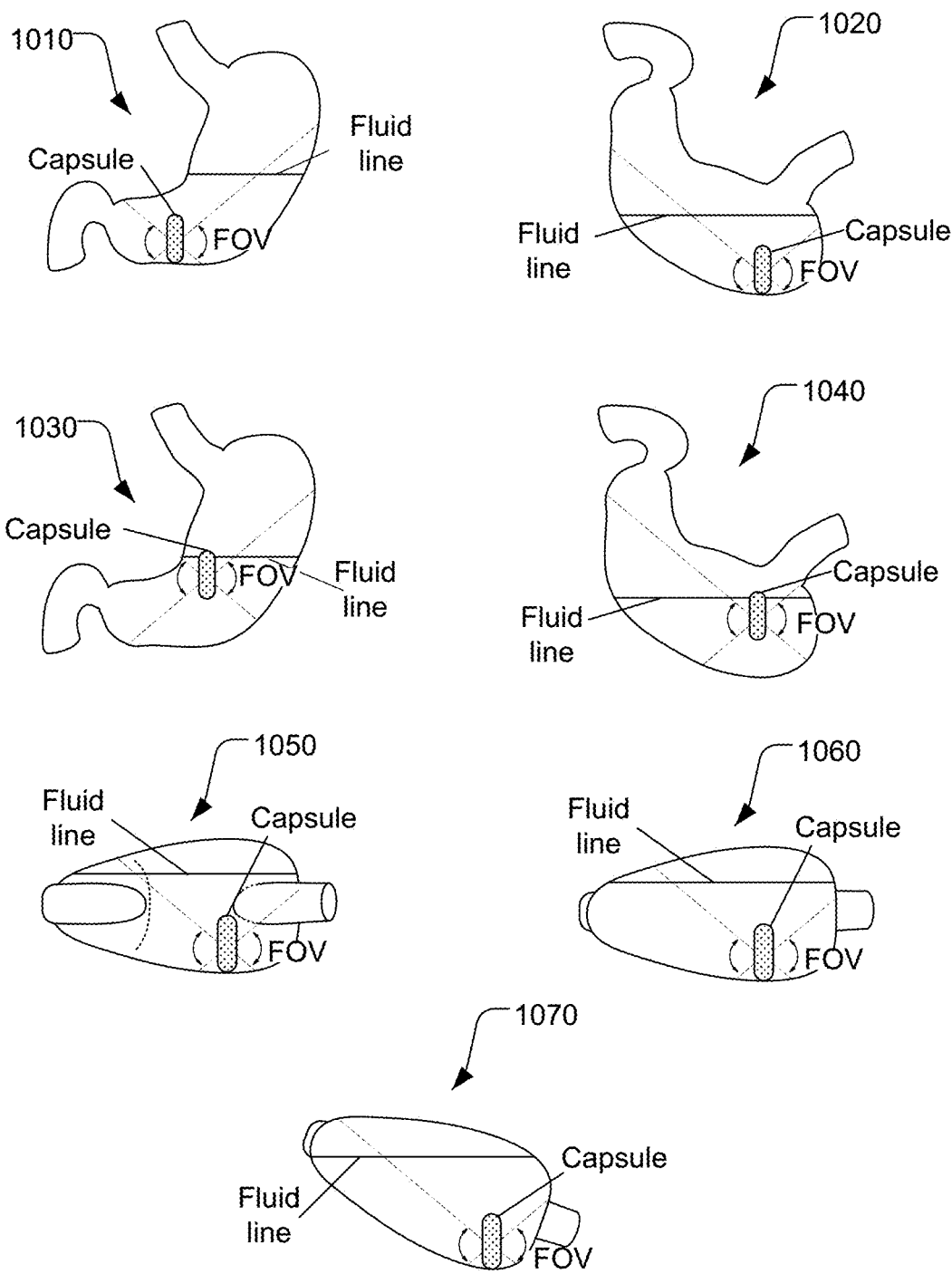
FIG. 10 illustrates various scenarios of a capsule camera in the stomach with the stomach partially filled with fluid, where each scenario corresponds to the positioner bed at a target tilt angle and the patient at a select lie pose.

FIG. 10 illustrates examples of getting the capsule to an estimated location for imaging the upper parts of the stomach by manipulating the patient positioning system, where drawings of the capsule in the stomach are viewed from the anterior side for drawing 1010-340. Drawing 1010 shows a non-buoyant (specific gravity SG>1) capsule in the stomach when the patient is upright. The capsule sits in or near the pylorus in the distal stomach. If the patient has recently consumed sufficient liquid (e.g. water), the capsule will reside below the fluid line. In these examples, the capsule camera has a panoramic field of view and captures images through the side wall of the capsule housing over a 360° lateral field-of-view. In drawing 1020, the patient is lying on his/her left side, and the capsule has moved into the proximal stomach. The same two stomach positions are shown drawing 1030 and drawing 1040 with a capsule that is buoyant (SG<1). In drawing 1050, it illustrates the stomach viewed from the right side with the patient prone. In drawing 1060, it illustrates the stomach viewed from the left side with the patient supine. Rotating the patient along the longitudinal axis (parallel with the length direction of the positioner bed) allows various surfaces of the stomach to be imaged by the capsule. For example, the capsule images the cardia in drawings 1050 and 1060, but not in drawing 1020. In drawing 1070, it illustrates the effective of reclining the patient 20° from the position of drawing 1060, shifting the field of view's coverage of the stomach mucosa. Likewise, Similar FOV shifts are achieved by reclining the patient from the positions shown in drawings 1020, 1040 and 1050.

Figure 1:
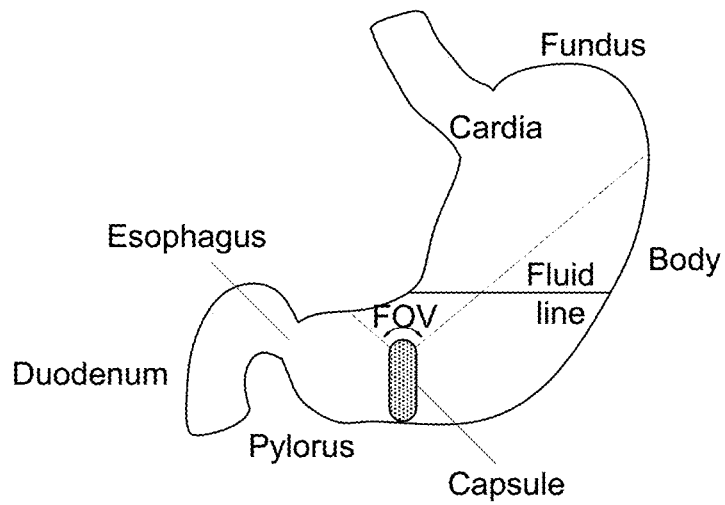
FIG. 1 illustrates a scenario that a forward-looking capsule camera drops to the bottom of the stomach, where the camera's field of view (FOV) can hardly perform good imaging of the upper part of the stomach.

Visualization through water is preferred to that through air or other gas because reflections and scattering of image-forming light at the capsule surface are minimized, the magnification of distant objects is increased, and specular reflections from mucosal surfaces are eliminated. The capsule with a lateral field of view primarily visualizes submerged surfaces while the capsule with a longitudinal view (FIG. 1) primarily views surfaces in air, if the camera is on the lighter end of the capsule. If the camera is on the heavier end of the capsule, the capsule with longitudinal view will tend to view submerged surfaces, but the camera will typically be very close to or touching the stomach wall, particularly if it is not buoyant, and thus may fail to capture some mucosal surfaces in image data.

The patient positioning system may include subsystems that help ensure that the patient moves through the series of prescribed motions correctly. If the positioner bed only tilts about one or more transverse axes but does not tilt longitudinally, the patient must perform a series of rolls, ideally under their own power, and these rolls must be synchronized with the bed motions. A clinician may control the bed motions and verbally instruct the patient when and how to roll. The positioner may include a user interface that issues a series of commands to the clinician or patient. For example, the patient positioning system may include a display that displays commands in words and/or pictograms. The positioner may issue commands using audio or video. The commands may be directed to the clinician. Alternatively, they may be directed to the patient. The positioner can follow a time-control program stored in memory. The sequence may involve issuing commands to the patient and adjusting the patient-positioning system position. The system may include sensors such as video cameras to monitor the patient's position. If the patient does not comply with the instructions, various actions can be taken, such as repeating the instruction or calling a clinician to help. Also, the patient-monitoring subsystem can raise an alarm if the patient appears to fall or is in distress. The system may also analyze one or more images of the patient captured by a camera outside the patient's body. Based on the image analysis, the system may determine whether a current examination position is in compliance.

In one embodiment, the patient positioning system may also include a viewing subsystem that can be configured to display the images captured. Furthermore, the viewing subsystem can be configured to emphasize, to health care professional or the viewer, the relevant images from above-mentioned 10°-30° based on the time or the sequence of the image combined with frame rate, or both. In general, the viewing subsystem can be configured to display the position and angle related to each image. The viewing subsystem may comprise processors, CPU (central processing unit) or similar programmable devices that can execute a set of intended processing steps according to software (e.g. various program codes or assembly codes) or firmware. The viewing subsystem may also be based on a note book or a mobile device such as a tablet.

Figure 11:
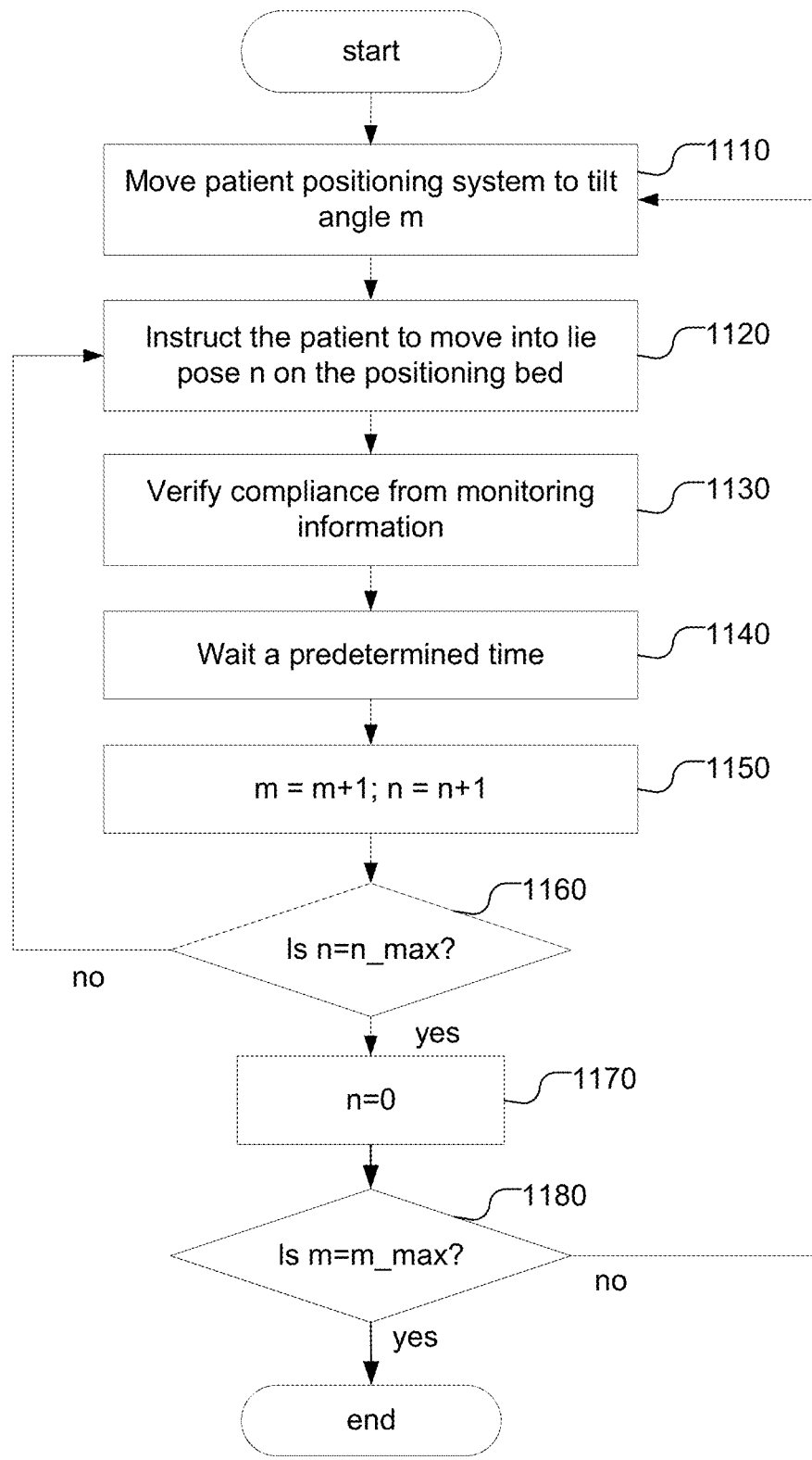
FIG. 11 illustrates an exemplary process to allow the capsule camera to take images at a set of tilt angles of the positioner bed and a set of patient lie poses.

FIG. 11 illustrates an exemplary control program for operating the patient positioning system. As mentioned before, the patient positioning system comprises a positioning bed, which may be inclined or reclined in the traverse direction. Also, the positioning bed can be rotated around the longitudinal axis. The program can set the positioning bed to a traverse position m as shown in step 1110, where the initial position can be m=0. Then, the patient is instructed to move to lie pose n as shown in step 1120, where the initial roll position can be n=0. The compliance is verified from monitoring information to check whether the patient is properly positioned on the positioning bed in step 1130. The monitoring information can be based on image/video data captured while the patient is subject to the positioning bed. Other sensor inputs may also be used to determine whether the patient is at a proper position. The positioner bed will stay still for a determined period of dwelling time so that stable images can be captured as shown in step 1140. In step 1150, both n and m are incremented. In step 1160, n is checked to determine whether n reaches maximum, n_max. If n is equal to n_max (i.e., the "yes" path from step 1160), the process goes to step 1170. Otherwise (i.e., the "no" path from step 1160), the process goes back to step 1120. In step 1170, n is set to 0. In step 1180, m is checked to determine whether m reaches maximum, m_max. If mn is equal to m_max (i.e., the "yes" path from step 1150), the process is terminated. Otherwise (i.e., the "no" path from step 1180), the process goes back to step 1110.

Figure 12:
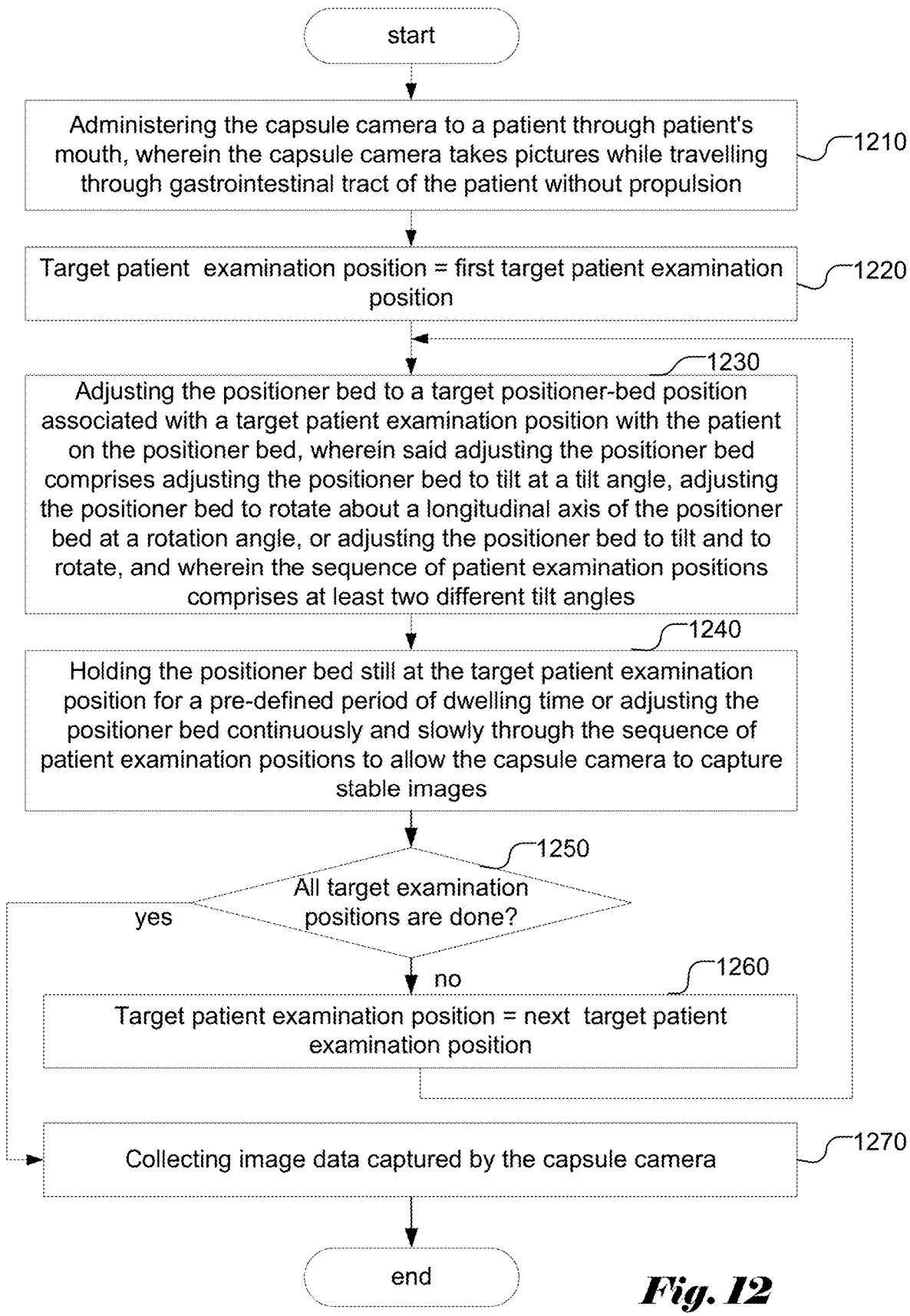
FIG. 12 illustrates an exemplary flowchart for imaging a patient's upper stomach using the patient positioning system and a capsule camera according to the present invention.

FIG. 12 illustrates an exemplary flowchart for imaging a patient's gastrointestinal tract using the patient positioning system and a capsule camera according to the present invention. In step 1210, the capsule camera is administering to a patient by swallowing the capsule camera through patient's mouth, where the capsule camera takes pictures autonomously while travelling through gastrointestinal tract of the patient. In step 1220, the target examination position is set to the first target examination position. In step 1230, the patient positioning system is adjusted to a target patient bed position associated with the target examination position with the patient on the patient bed, where said adjusting the patient positioning system comprises adjusting the patient bed to tilt at a tilt angle, and the set of examination positions comprises at least two different tilt angles. In step 1240, the patient positioning system is held still at the target examination position for a pre-defined period of time to allow the capsule camera to capture stable pictures. Whether all target examination positions are done is check in step 1250. If all target examination positions are done (i.e., the "yes" path from step 1250), step 1270 is performed, where image data captured by the capsule camera are collected and the process is terminated. Otherwise (i.e., the "no" path from step 1250), the target examination position is moved to the next target examination position as shown in step 1260 and the process goes to step 1230. If the capsule endoscope has on-board storage for the image data, said collecting image data may correspond to reading out image data from the on-board memory. If the capsule endoscope uses a wireless transmitter for transmitting the captured image, said collecting image data may correspond to transmitting data from the transmitter to the base-station receiver outside the body and transferring the image data from the receiver to system memory.

Figure 13:
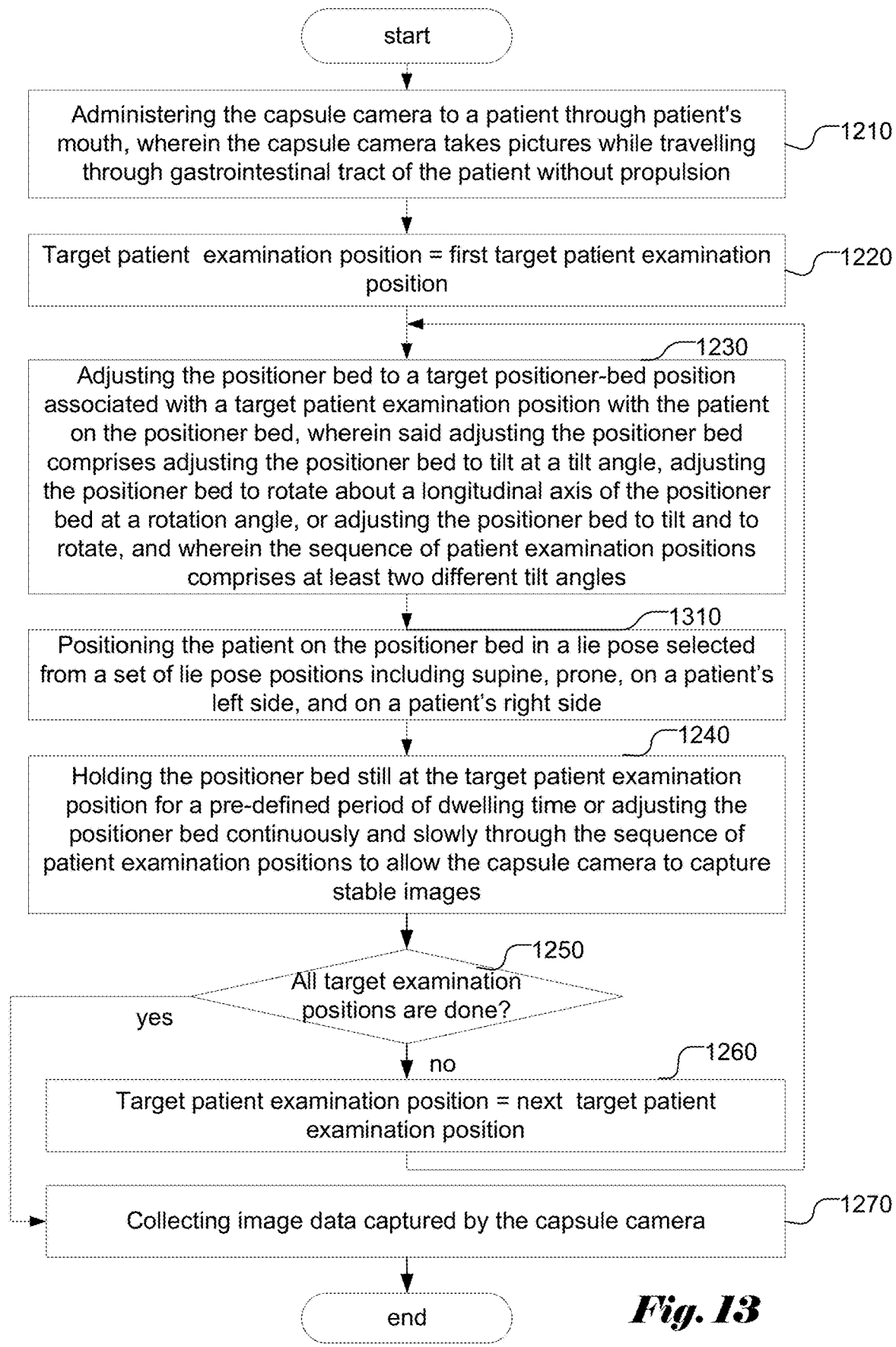
FIG. 13 illustrates another exemplary flowchart for imaging a patient's upper stomach using the patient positioning system and a capsule camera according to the present invention.

FIG. 13 illustrates another exemplary flowchart for imaging a patient's gastrointestinal tract using the patient positioning system and a capsule camera according to the present invention. The system in FIG. 13 is substantially similar to the system in FIG. 12, except that an additional step (1310) is inserted between step 1230 and step 1240. In step 1310, the patient is positioned on the positioner bed in a lie pose selected from a set of lie pose positions including supine, prone, on a patient's left side, and on a patient's right side.

The patient positioning system may include a communication channel to communicate with the capsule camera. The communication channel may correspond to transmit only, receive only or both transmit and receive. In-vivo image data may be transmitted in real time or stored in memory in the capsule and transmitted after some delay. Video data may be displayed on a monitor to the clinician, and the patient-positioner position and the patient's lie position on the positioner may be adjusted in response to the video data. For example, once a target gastric surface is visualized on the monitor, the patient position may be immediately changed without dwelling at an examination position in the pre-scribed series a pre-determined time interval. If a target surface is not visualized, a patient's position may be adjusted as necessary to achieve a complete examination. The changes in position may occur due to actions taken by the clinician viewing the video, such as controlling the positioner through manual manipulation or by issuing commands to the positioner controller via the user interface; the clinician may issue instructions to the patient to change their lie position; or the clinician may issue commands or status updates, such as the accomplishment of a visualization task in a series of visualization tasks, to the control system that then issues instructions to the patient, for example via audio or video. As mentioned earlier, the monitor may be part of the viewing subsystem of the patient positioning system.

The communication channel may also be used to transmit commands to the capsule to adjust operational parameters such as camera frame rate, focus, exposure, or illumination level. Suitably enabled capsule may also be instructed to collect biopsies or perform therapies. Some capsule embodiments may include propulsion and navigation systems that may be controlled by commands sent via the communication channel. These commands may be synchronized with the control of the positioner bed position so that the navigation of the capsule is synchronized with changes in examination position to optimize gastric surface visualization. Furthermore, the system may adjust the positioner bed, adjust the patient's lie pose or both in response to the data received. For example, the data may comprise images of the patient's gastrointestinal tract and said adjusting the positioner bed, adjusting a lie pose of the patient or both are made to alter an area of the gastrointestinal tract that is imaged by the capsule camera.

In another embodiment of the present invention, the system may comprise forming correspondences between multiple images in the image data with said at least two target patient examination positions at a time when said images were captured and storing the correspondences, the image data, and the patient examination positions in a computer memory. The correspondences can be based on image timestamps and timing of the sequence of patient examination positions as determined by a computer program controlling the positioner bed or by a log from sensors monitoring a patient examination position The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A patient positioning system for imaging a gastrointestinal tract for a patient using a capsule camera, the patient positioning system comprising:
   a positioner bed adapted to allow the patient to lie on the positioner bed;
   a support frame;
   at least three support posts connected between the positioner bed and the support frame, wherein at least two of said at least three support posts are configured to adjust height according to one or more control signals so as to cause the positioner bed to tilt at a tilt angle, to cause the positioner bed to rotate about a longitudinal axis of the positioner bed by a rotation angle;
   a controller coupled to said at least two of said at least three support posts to provide said one or more control signals to control the tilt angle, the rotation angle or both via controlling said at least two of said at least three support posts to cause the patient on the positioner bed to go through a sequence of patient examination positions;
   a memory device to store program codes; and
   wherein the program codes are executable on the controller to cause the patient on the positioner bed to go through the sequence of patient examination positions, and wherein the controller is configured to cause a rate of tilt or rotation angle change according to a frame capture rate of the capsule camera.

2. The patient positioning system of claim 1, wherein the frame capture rate of the capsule camera is pre-defined.

3. The patient positioning system of claim 1, wherein the controller is configured to communicate with the capsule camera in order to receive the frame capture rate of the capsule camera.

4. The patient positioning system of claim 1 wherein the controller is configured to cause at least one frame being captured for every two degrees change of positioner bed tilt or rotation angle.

5. The patient positioning system of claim 1 wherein each of said at least three support posts is connected to the positioner bed through a universal joint.

6. The patient positioning system of claim 1 wherein each of said at least two of said at least three support posts is connected to the support frame through a joint.

7. The patient positioning system of claim 1, further comprises a restraint to hold down the patient onto the positioner bed.

8. The patient positioning system of claim 1, wherein the rotation angle has a range covering at least 180° rotation about the longitudinal axis of the positioner bed.

9. The patient positioning system of claim 1, further comprises a monitoring subsystem to monitor the tilt angle, the rotation angle, or a combination thereof to verify a current examination position being compliant.

10. The patient positioning system of claim 9, wherein the monitoring subsystem comprises an image input device to capture one or more images of patient's pose position for determining the current examination position.

11. The patient positioning system of claim 1, further comprises a user interface to issue a series of commands to the patient or a clinician for changing patient's position on the positioner bed according to the sequence of patient examination positions.

12. The patient positioning system of claim 11, wherein the series of commands is issued via audio or by visual display to instruct or demonstrate correct movements or positioning associated with the sequence of patient examination positions.

13. The patient positioning system of claim 1, wherein the program codes are configured to cause at least two different tilt angles to be included in the sequence of patient examination positions.

14. The patient positioning system of claim 1, wherein the program codes are configured to cause at least one tilt angle, corresponding to a patient's upper body reclined at an angle in a range from 10° to 30°, to be included in the sequence of patient examination positions.

15. The patient positioning system of claim 14, wherein the program codes are configured to cause a set of tilt angles included in the sequence of patient examination positions, wherein the set of tilt angles corresponds to patient's upper body reclined to a first angle and then to a second angle in small steps, and wherein the first angle is approximately 0° or less and the second angle is in the range from 10° and 30°.

16. The patient positioning system of claim 14, wherein the program codes are configured to cause at least a portion of the positioner bed to tilt in continuous motion.

17. The patient positioning system of claim 1, wherein the program codes are configured to cause at least two different rotation angles about the longitudinal axis of the positioner bed.

18. The patient positioning system of claim 1, wherein the program codes are configured to change tilt angle and rotation angle at sufficiently slow rates to minimize instability of capsule orientation and allow the capsule camera to capture stable images.

19. The patient positioning system of claim 18, wherein the program codes are configured to cause holding the positioner bed still at at-least one examination position for a pre-defined period of dwelling time.

20. The patient positioning system of claim 1, wherein the program codes are configured to cause the positioner bed to return to a flat position while the patient changes position to reduce patient's effort and risk of falling off the positioner bed.

21. The patient positioning system of claim 1, further comprises a viewing subsystem to display images captured by the capsule camera, wherein patient's pose position, the tilt angle, or both, concomitant with capture of at least one displayed image, is displayed by the viewing subsystem at a same time as said at least one displayed image.

22. The patient positioning system of claim 1, further comprises a communication channel to communicate with the capsule camera.

23. The patient positioning system of claim 22, wherein the communication channel is configured to receive images or other sensor data captured by the capsule camera, to transmit one or more commands to the capsule camera, or both.

24. The patient positioning system of claim 23, wherein the positioner bed is adjusted in response to the images received from the capsule camera.

25. The patient positioning system of claim 23, wherein said one or more commands cause the capsule camera to adjust operational parameters.

* * * * *